United States Patent
Yabe et al.

(10) Patent No.: US 8,939,633 B2
(45) Date of Patent: Jan. 27, 2015

(54) AREA LIGHT SOURCE DEVICE

(75) Inventors: Mamoru Yabe, Sakado (JP); Tomokazu Shimoda, Kawagoe (JP); Yoshiyuki Masu, Sayama (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 121 days.

(21) Appl. No.: 13/172,002

(22) Filed: Jun. 29, 2011

(65) Prior Publication Data
US 2012/0002437 A1    Jan. 5, 2012

(30) Foreign Application Priority Data

Jun. 30, 2010    (JP) .................................. 2010-148865

(51) Int. Cl.
F21V 8/00    (2006.01)

(52) U.S. Cl.
CPC ............ *G02B 6/0028* (2013.01); *G02B 6/0016* (2013.01); *G02B 6/0018* (2013.01); *G02B 6/0038* (2013.01); *G02B 6/0053* (2013.01)
USPC .......................................... 362/626; 362/620

(58) Field of Classification Search
USPC ................................. 362/617–626
See application file for complete search history.

(56) References Cited

U.S. PATENT DOCUMENTS

| | | |
|---|---|---|
| 2006/0062016 A1 | 3/2006 | Dejima et al. |
| 2010/0195019 A1 | 8/2010 | Shinohara et al. |
| 2010/0245717 A1 | 9/2010 | Miyamoto et al. |
| 2011/0205759 A1 | 8/2011 | Kurata et al. |
| 2012/0002441 A1 | 1/2012 | Yabe et al. |

FOREIGN PATENT DOCUMENTS

| | | | |
|---|---|---|---|
| JP | 05-203950 A | | 8/1993 |
| JP | 2001060411 A | | 3/2001 |
| JP | 2003-307731 A | | 10/2003 |
| JP | 2005-183029 A | | 7/2005 |
| JP | 2006-236641 A | * | 1/2006 |
| JP | 2006093104 A | | 4/2006 |
| JP | 2006-133274 A | | 5/2006 |
| JP | 2009-080947 A | | 4/2009 |
| JP | 4279761 B2 | | 6/2009 |
| JP | 2010-040434 A | | 2/2010 |

(Continued)

OTHER PUBLICATIONS

Office Action for Korean Application No. 10-2011-0059574 dated Oct. 21, 2012, with English translation thereof (10 pages).

(Continued)

*Primary Examiner* — Anh Mai
*Assistant Examiner* — Brenitra M Lee
(74) *Attorney, Agent, or Firm* — Osha Liang LLP

(57) ABSTRACT

An area light source device has a light guide plate including a light incident end face, a light guide plate main body thinner than a thickness of the light incident end face, and a light introducing unit formed in continuation with the light guide plate main body and so that thickness gradually becomes thinner from the light incident end face side towards the light guide plate main body side, a light source arranged at a position facing the light incident end face, a diffuser plate and one or more prism sheets arranged on a surface on a light emission side of the light guide plate main body, and a light shielding sheet arranged on an upper side of the diffuser plate and the prism sheet in a region excluding a light emitting region of the light guide plate main body.

9 Claims, 16 Drawing Sheets

(56) References Cited

FOREIGN PATENT DOCUMENTS

| | | |
|---|---|---|
| JP | 2010-044994 A | 2/2010 |
| JP | 2010-114073 A | 5/2010 |
| JP | 2010113149 A | 5/2010 |
| KR | 20100007982 A | 1/2010 |
| TW | 200916844 A | 4/2009 |
| TW | 201011403 A1 | 3/2010 |
| TW | 201013119 A1 | 4/2010 |
| TW | 201017229 A1 | 5/2010 |

OTHER PUBLICATIONS

Patent Abstract for Japanese Publication No. 2010-113149 published May 20, 2010 (1 page).
Patent Abstract for Japanese Publication No. 2010-040434 published Feb. 18, 2010 (2 pages).
Patent Abstract for Japanese Publication No. 2001-060411 published Mar. 6, 2001 (2 pages).
Patent Abstract for Japanese Publication No. 05-203950 published Aug. 13, 1993 (2 pages).
Office Action issued in corresponding Japanese Application No. 2010-148865 mailed Oct. 29, 2013 (8 pages).
Patent Abstracts of Japan, Publication No. 2006-133274 dated May 25, 2006 (1 page).
Patent Abstracts of Japan, Publication No. 2009-080947 dated Apr. 16, 2009 (1 page).
Patent Abstracts of Japan, Publication No. 2003-307731 dated Oct. 31, 2003 (1 page).
Patent Abstracts of Japan, Publication No. 2010-114073 dated May 20, 2010 (2 pages).
Patent Abstracts of Japan, Publication No. 2005-183029 dated Jul. 7, 2005 (2 pages).
Patent Abstracts of Japan, Publication No. 2010-044994 dated Feb. 25, 2010 (2 pages).
Examination Report in counterpart Taiwanese Patent Application No. 100122752 mailed on Jan. 28, 2014 (14 pages).

\* cited by examiner

AREA LIGHT SOURCE DEVICE

BACKGROUND OF THE INVENTION

1. Technical Field

The present invention relates to area light source devices, and in particular, to an area light source device used in a back light or the like to illuminate a liquid crystal panel from a rear surface.

2. Related Art

In an edge light type area light source device, a light source is arranged facing a light incident end face of a flat plate shaped light guide plate, and a diffuser plate or a prism sheet is overlapped on the upper surface of the light guide plate. In the area light source device, if the thickness of the light guide plate is smaller than the height of the light source, the light emitted from the light source does not enter the light guide plate from the light incident end face and the light that escapes to the outer side than the light incident end face increases, and hence the usage efficiency of the light worsens. The thickness of the light guide plate is thus made substantially equal to the height of the light source.

Consideration is made in thinning the height of the light source and the thickness of the light guide plate when attempting to thin the entire thickness of the area light source device. However, there is a restriction in manufacturing for the light source and it is difficult to reduce the height even if the thickness of the light guide plate can be thinned. Therefore, the thickness of the area light source device cannot be thinned to smaller than or equal to a certain extent with the method of reducing the height of the light source and the thickness of the light guide plate.

As shown in FIG. 1, an area light source device 11 in which a thickness of a light incident unit 15 including a light incident end face 14 is substantially equal to the height of a light source 12, a flat plate shaped light guide plate main body 17 having a thickness thinner than the light incident end face 14 is arranged on the side opposite to the light incident end face 14 of a light guide plate 13, and a wedged shaped light introducing unit 16 is formed between the light incident unit 15 and the light guide plate main body 17 so as to continue them is proposed. In the area light source device 11, the difference between the thickness of the light incident end face 14 and the thickness of the light guide plate main body 17 is made substantially equal to the total thickness of a diffuser plate 19 and prism sheets 20, 21, so that the entire thickness of the area light source device 11 can be thinned by overlapping the diffuse plate 19 and the prism sheets 20, 21 on the upper surface of the light guide plate main body 17. Furthermore, in the area light source device 11, the light emitted from the light source 12 is efficiently retrieved into the light incident unit 15 from the light incident end face 14 since the height of the light source 12 and the thickness of the light incident end face 14 are substantially equal. Moreover, the light that entered the light incident unit 15 is guided to the light guide plate main body 17 while totally reflecting at an inclined surface 18 and a lower surface of the light introducing unit 16 so that the leakage light at the light guide plate 13 can be reduced since the upper surface of the light introducing unit 16 is the inclined surface 18 and the light incident unit 15 having a large thickness and the light guide plate main body 17 having a thin thickness are smoothly connected through the light introducing unit 16.

However, if the area light source device is used as a back light of the liquid crystal panel, the upper surface of the light introducing unit and the outer peripheral part of the upper surface of the light guide plate main body are covered with a light shielding tape (mainly black adhesive sheet) and the liquid crystal panel is overlapped on the upper surface thereof to prevent stray light from entering the liquid crystal panel. The light shielding tape thus sometimes sticks to the inclined surface of the light introducing unit, where the light in the light guide plate entered from the inclined surface is absorbed by the light shielding tape when the light shielding tape sticks to the inclined surface, and hence the luminance of the area light source device may lower or luminance unevenness may occur.

In the area light source device disclosed in Japanese Patent Publication No. 4279761, the end of a diffuser plate 19 positioned at the very bottom of the sheets overlapped on the upper surface of the light guide plate main body 17 is extended to be overlapped on the upper surface of the inclined surface 18, so that the extended diffuser plate 19 prevents the light shielding tape 19 from sticking to the inclined surface 18, as shown in FIG. 2.

SUMMARY

However, in the area light source device disclosed in Japanese Patent Publication No. 4279761, the light easily leaks from the inclined surface 18 of the light introducing unit 16 for the following reasons.

A) The light is guided through the light guide plate while repeating total reflection at the upper surface and the lower surface of the light guide plate, where the light is less likely to leak from the upper surface and the lower surface of the light guide plate if the light guide plate is a flat plate since the incident angle of the light entering the upper surface or the lower surface of the light guide plate does not change regardless of the repeat of the total reflection.

In the case of the light guide plate 13 including the inclined surface 18 as in Japanese Patent Publication No. 4279761, the incident angel of the light that re-enters the inclined surface 18 becomes smaller each time the light is totally reflected at the lower surface and the inclined surface 18 of the light guide plate 13, and hence the light around the critical angle of total reflection (hereinafter, the critical angle of total reflection is simply referred to as critical angle) increases as the light is farther away from the light incident end face 14, and the proportion of the light leaking from the inclined surface 18 increases.

B) As the emitted light from the light source has a substantially Lambert distribution, the light having the strongest light emission intensity of the light emitted from the light source is the light at the middle of the light emitting surface of the light source and furthermore, is the light in a direction perpendicular to the light emitting surface. Therefore, the light having the maximum intensity of the light guided through the light guide plate is the light that advances through the middle of the light guide plate in a direction perpendicular to the light incident end face (in the actual light guide plate, the distribution of light is uniformized as the light is farther away from the light source due to the influence of the bump patterns at the inclined surface of the light guide plate or the lower surface of the light guide plate, but the intensity of the light advancing through the middle of the light guide plate in a direction perpendicular to the light incident end face is generally large around the light incident unit.)

In the area light source device 11 of Japanese Patent Publication No. 4279761, the diffuser plate 19 is extended to the front surface of the inclined surface 18, and hence if light enters a closely attached region of the diffuser plate 19 in the inclined surface 18, the light leaks to the outside through the diffuser plate 19 since the difference in index of refraction at the boundary is small, as shown in FIG. 2. Furthermore, the proportion of the leakage light with respect to the total amount of light of the light source 12 becomes large since the light around the maximum intensity also enters the inclined surface 18.

Since microscopic bumps actually exist on the back surface of the diffuser plate 19, the entire back surface of the extended portion of the diffuser plate 19 is not closely attached to the inclined surface 18, where the light is totally reflected at the portion including an air layer 22 but the light near the maximum intensity also enters the inclined surface 18, and hence significant amount of leakage light is generated even if only some light leaks through the diffuser plate 19.

C) In the area light source device 11 of Japanese Patent Publication No. 4279761, microscopic scratches is easily formed at the inclined surface 18 when the corner of the diffuser plate 19 is brought into contact therewith since the inclined surface 18 of the light guide plate 13 is flat, whereby the light easily leaks from the inclined surface 18 by such a scratch. In particular, the leakage of light becomes greater when microscopic scratches form near the end on the light guide plate main body side of the inclined surface 18.

When light leaks from the inclined surface 18, the light transmitted and diffused by the diffuse plate 19 enters the end faces of the prism sheets 20, 21 or between the sheets 20, 21, as shown in FIG. 3. The light that entered between the sheets 20, 21 is bent to the upper side by the prism sheet 21, where some of the light are absorbed by a light shielding tape 23 but the remaining light reach the opening of the light shielding tape 23 (light emitting region of the light guide plate main body 17) thus becoming a redundant light and forming a hot spot (i.e., unevenly bright luminescent spot). The light that entered the prism sheets 20, 21 from the respective end faces is gradually exit to the upper side while being guided through the interior of the prism sheets 20, 21, and hence an elongate luminance unevenness (emission line) is formed in the opening of the light shielding tape 23. As a result, the host spot and the luminance unevenness are formed in the light emitting region of the area light source device 11, and the light emission quality of the area light source device 11 lowers. Furthermore, the luminance of the light emitting region may lower when the leakage of light from the inclined surface 18 becomes large.

If the inclination angle of the inclined surface 18 is gradual, the leakage of light is small, the light diffusion effect by the diffuser plate 19 is obtained and the hot spot and the luminance unevenness do not stand out, and furthermore, the lowering in the light emission quality is small. However, the inclination angle of the inclined surface is becoming steep in recent years with the tendency to thin the area light source device, and the lowering in the light emission quality and the lowering in the luminance are becoming significant.

One or more embodiments of the present invention provides an area light source device capable of preventing lowering of light emission quality such as hot spot and luminance unevenness due to the leakage light from an inclined surface of a light guide plate.

In accordance with one aspect of the present invention, there is provided an area light source device including: a light guide plate including a light incident end face, a light guide plate main body thinner than a thickness of the light incident end face, and a light introducing unit formed in continuation with the light guide plate main body and so that thickness gradually becomes thinner from the light incident end face side towards the light guide plate main body side; a light source arranged at a position facing the light incident end face; a diffuser plate and one or more prism sheets arranged on a surface on a light emission side of the light guide plate main body; and a light shielding sheet arranged on an upper side of the diffuser plate and the prism sheet in a region excluding a light emitting region of the light guide plate main body; wherein at least one of the one or more prism sheets is extended towards a front surface of the light introducing unit.

The area light source device of the present invention has the thickness of the entire area light source device thinned by overlapping a diffuser plate or a prism sheet on a light guide plate main body, which is thinner than the light incident end face, but the light leaks from the front surface of the non-plate shaped light introducing unit and becomes a stray light in the light guide plate of such a mode thus lowering the light emission quality due to hot stop, luminance unevenness, and the like.

In the area light source device of the present invention, however, the light that leaked from the front surface of the light introducing unit is entered to the prism sheet to be bent towards a direction substantially perpendicular to the prism sheet and absorbed by the light shielding sheet since the prism sheet is extended to the front surface of the light introducing unit so that the front surface of the light introducing unit is covered with the prism sheet. Therefore, the light that leaked from the light introducing unit can be prevented from becoming a stray light and causing hot spot and luminance unevenness, so that the light emission quality of the area light source device can be enhanced.

In an area light source device according to one or more embodiments of the present invention, the diffuser plate is arranged on a surface on the light emission side of the light guide plate main body, and two prism sheets in which a prism is formed on a surface on a side opposite to a surface facing the diffuser plate is overlapped on the diffuser plate; and at least one of the two prism sheets is extended towards the front surface of the light introducing unit. According to one or more embodiments of the present invention, the prism sheet overlapped on the diffuser plate at the front surface of the light guide plate main body is extended to the light introducing unit side to cover the front surface of the light introducing unit, so that the prism sheet is less likely to adhere to the front surface of the light introducing unit. Therefore, the light in the light introducing unit is less likely to leak out from the front surface and thus the stray light is less likely to be produced, and the lowering of the light emission quality can be suppressed. Furthermore, the light emitting luminance in the light guide plate main body can be enhanced since the leakage light from the light introducing unit can be reduced.

In one or more embodiments of the present invention, two prism sheets may be stacked at the front surface of the light introducing unit. If two prism sheets are stacked on the front surface of the light introducing unit, the light that leaked from the front surface of the light introducing unit passes through the prism sheet twice, and thus the proportion of the light deflected in the direction perpendicular to the prism sheet and absorbed by the light shielding sheet increases.

According to one or more embodiments of the present invention, an air layer is arranged between the prism sheet extended towards the front surface of the light introducing unit and the front surface of the light introducing unit. If an air layer is arranged between the prism sheet and the front surface of the light introducing unit, the light is less likely to leak from the front surface of the light guide plate, and hence the lowering of the light emission quality of the area light source device can be suppressed and the light emitting luminance can be enhanced.

In an area light source device according to one or more embodiments of the present invention, one prism sheet in which a prism is formed on a surface facing the light guide plate main body is arranged on a surface on the light emission side of the light guide plate main body, and the diffuser plate is overlapped on the prism sheet. Accordingly, the light that passed through the prism sheet can be efficiently deflected in the direction perpendicular to the prism sheet and greater amount of light can be absorbed with the light shielding sheet since the prism sheet in which the prism is formed at the lower surface is used.

In an area light source device according to one or more embodiments of the present invention, the diffuser plate is arranged at a position spaced apart than a boundary of the light introducing unit and the light guide plate main body. Accordingly, the light that leaked from the light introducing unit is less likely to enter the diffuser plate from the end face of the diffuser plate since the end face of the diffuser plate is spaced apart from the light introducing unit, and hence the lowering of the light emission quality can be suppressed.

In an area light source device according to one or more embodiments of the present invention, at least one extended prism sheet of the one or plurality of prism sheets is arranged so that a prism ridge direction forms an angle of greater than or equal to 30° and smaller than or equal to 90° with respect to a direction perpendicular to the light incident end face. The angle the prism ridge direction forms with respect to the direction perpendicular to the light incident end face is defined such that the angel measured from the direction perpendicular to the light incident end face is greater than or equal to 0° and smaller than or equal to 90° regardless of the rotation direction of the prism ridge. According to the embodiment, the light that leaked from the front surface of the light introducing unit is less likely to be regressively reflected by the prism sheet. Therefore, the light regressively reflected by the prism sheet can be prevented from again returning into the light guide plate and being exit from the light emitting region, so that the lowering of the light emission quality can be suppressed.

An area light source device according to one or more embodiments of the present invention, the surface on the light emission side of the light introducing unit is an inclined surface. Accordingly, the surface on the light emission side of the light guide plate main body can be depressed, and the diffuser plate or the prism sheet can be accommodated therein.

In an area light source device according to one or more embodiments of the present invention, the surface on the light emission side of the light introducing unit is formed as if expanded with a plurality of planes. Accordingly, the corner of the prism sheet can be floated from the front surface of the light introducing unit, so that the front surface of the light introducing unit can be prevented from being scratched by the corner of the prism sheet and the light that leaks out from the scratched area can be reduced.

In an area light source device according to one or more embodiments of the present invention, the surface on the light emission side of the light introducing unit is formed as if expanded with a curved surface. Accordingly, the corner of the prism sheet can be floated from the front surface of the light introducing unit, so that the front surface of the light introducing unit can be prevented from being scratched by the corner of the prism sheet and the light that leaks out from the scratched area can be reduced.

BRIEF DESCRIPTION OF THE DRAWINGS

FIG. 6B is a partially broken cross-sectional view of the area light source device of the first embodiment and FIG. 6A is a plan view excluding the light shielding tape;

FIG. 7 is an explanatory view describing the method of defining the arrangement of the diffuse plate, the light shielding tape, and the like;

DETAILED DESCRIPTION

Hereinafter, embodiments of the present invention will be described with reference to the accompanied drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. It should be recognized that the present invention is not limited to the following embodiments, and various design changes may be made within a scope not deviating from the gist of the present invention.

First Embodiment

Figure 1:
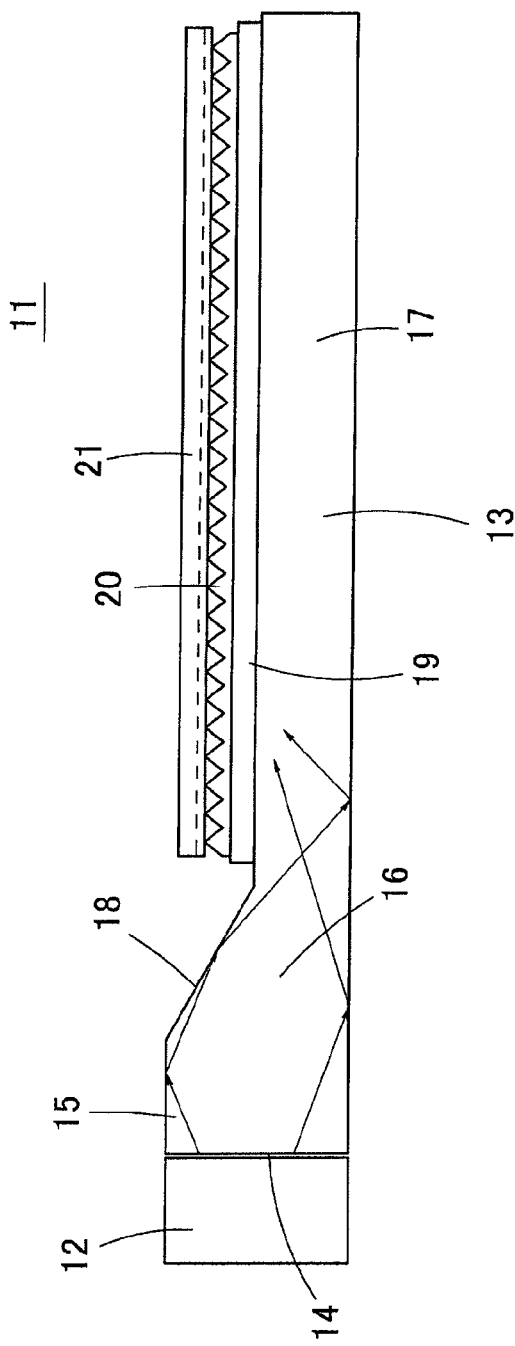
FIG. 1 is a schematic cross-sectional view showing a conventional area light source device.
Figure 2:
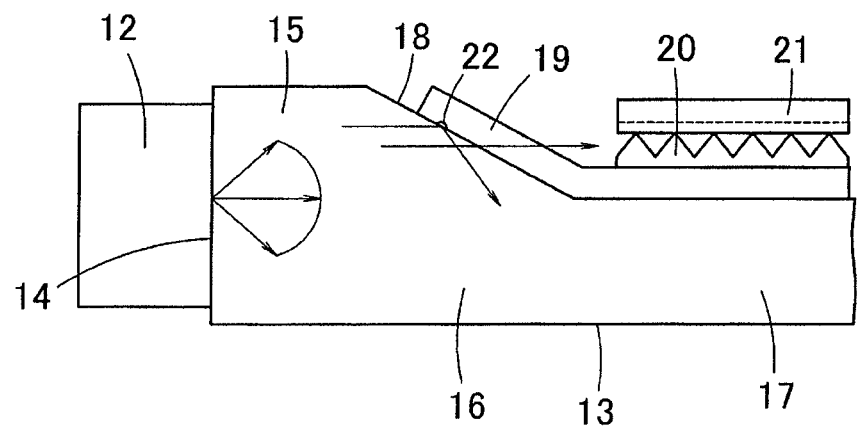
FIG. 2 is a view showing a behavior of light in the area light source device disclosed in Japanese Patent Publication No. 4279761.
Figure 3:
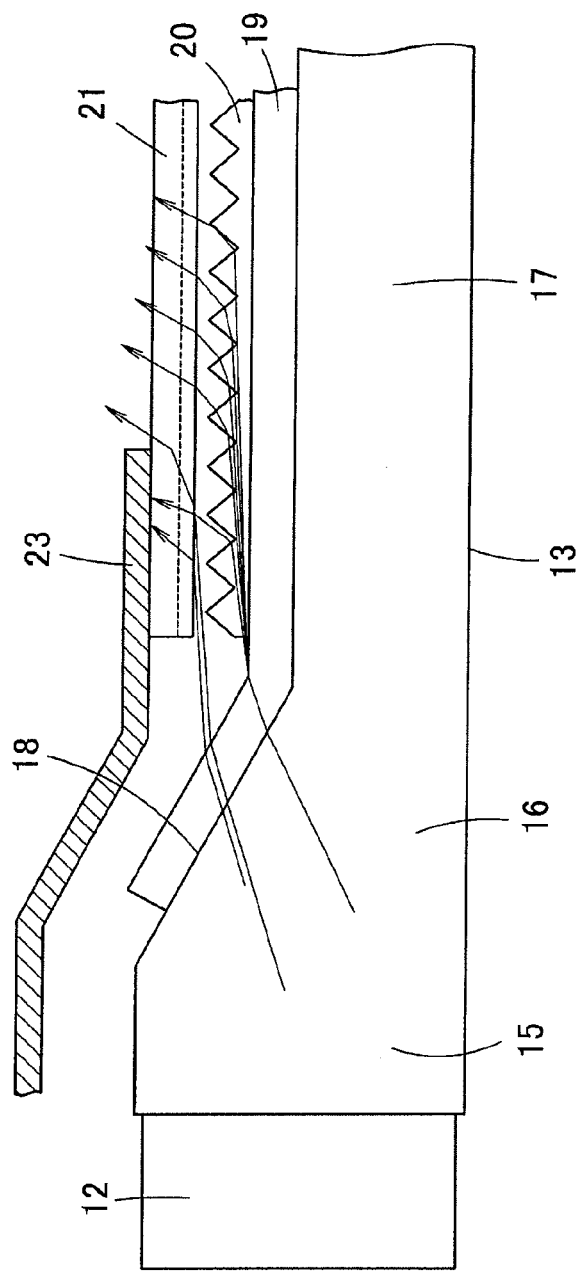
FIG. 3 is a view describing the causes of lowering in light emission quality due to light leaked from an inclined surface in the area light source device disclosed in Japanese Patent Publication No. 4279761.
Figure 4:
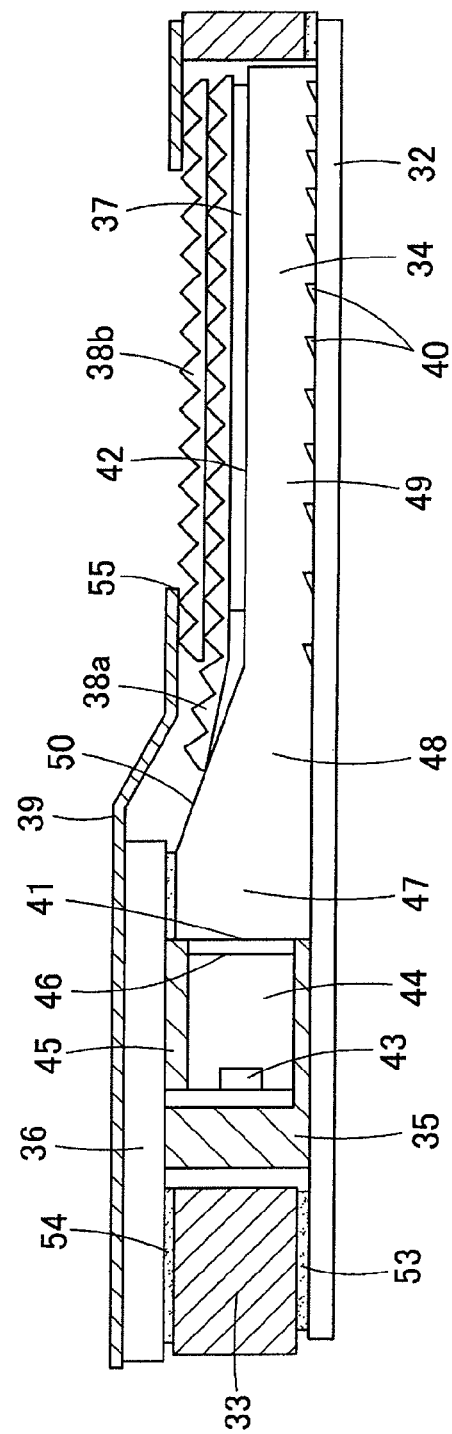
FIG. 4 is a schematic cross-sectional view of an area light source device according to a first embodiment of the present invention.
Figure 5:
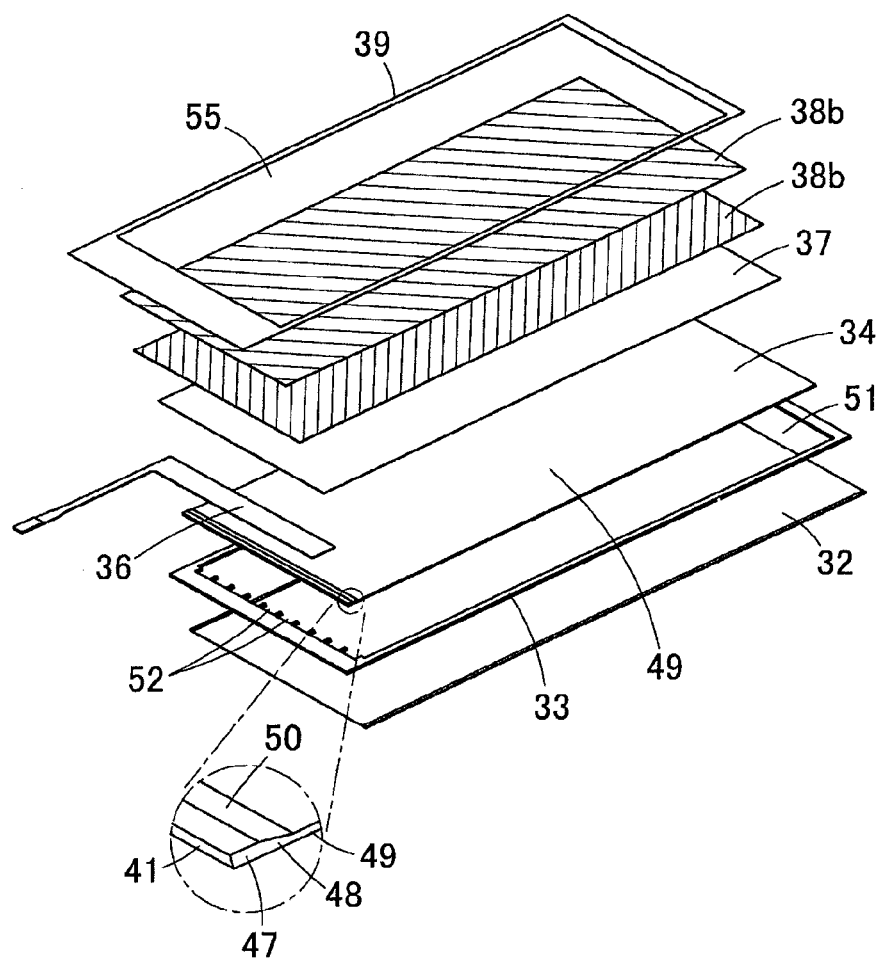
FIG. 5 is an exploded perspective view of the area light source device of the first embodiment.

The configuration of an area light source device 31 according to a first embodiment of the present invention will be described first with reference to FIG. 4 and FIG. 5. FIG. 4 is a schematic cross-sectional view of the area light source device 31. FIG. 5 is an exploded perspective view of the area light source device 31.

As shown in FIG. 4, the area light source device 31 includes a reflection plate 32, a frame 33, a light guide plate 34, a plurality of light sources 35, a flexible print substrate 36, a diffuser plate 37, two prism sheets 38a and 38b, a light shielding tape 39 (light shielding sheet), and the like.

As shown in FIG. 4, the light source 35 (LED light emitting element) is a side view type in which a blue light emitting LED chip 43 is sealed in a translucent resin 44 containing fluorescent substance and the surface excluding the front surface of the resin 44 is covered with a white resin 45. When the LED chip 43 emits light, the blue light emitted from the LED chip 43 is emitted towards the front side from the front surface (light emission window 46) of the resin 44 while being converted to a pseudo-white light. One part of the light emitted from the LED chip 43 is reflected at the boundary of the resin 44 and the white resin 45, and then emitted towards the front side from the light emission window 46.

The plurality of light sources 35 are mounted on the lower surface of the flexible print substrate 36, and lined in a line at a constant pitch.

For instance, NSSW204 manufactured by Nichia Corporation having a thickness of 0.4 mm may be used for the side view type light source 35, and that having a thickness of 0.1 mm may be used for the flexible print substrate 36.

The light guide plate 34 is molded by a translucent resin having high index of refraction such as polycarbonate resin or polymethylmethacrylate (PMMA) resin. A light incident end face 41 for introducing light into the light guide plate 34 is formed at the end face of the light guide plate 34, where the height of the light incident end face 41 is greater than the height of the light emission window 46 of the light source 35. A light incident unit 47 including the light incident end face 41 has a uniform thickness, where a plate shaped light guide plate main body 49 having a thickness thinner than the light incident unit 47 is arranged on the opposite side of the light incident unit 47, and a wedge shaped light introducing unit 48 is formed between the light incident unit 47 and the light guide plate main body 49 to connect them. In the light guide plate 34, the light guide plate main body 49 occupies majority of the area, and a great number of microscopic deflection patterns 40 (diffusion unit) for totally reflecting or diffusing the light guided therethrough and emitting the same to the upper side from the upper surface (light exit surface 42) of the light guide plate main body 49 is formed at the lower surface of the light guide plate main body 49. The upper surface of the light introducing unit 48 is an inclined surface 50 downwardly inclined from the upper surface of the light incident unit 47 towards the upper surface of the light guide plate main body 49.

For example, the light guide plate 34 is molded by polycarbonate resin, the thickness of the light incident unit 47 is 0.43 mm, the inclination angle of the inclined surface of the light introducing unit 48 is about 10°, and the thickness of the light guide plate main body 49 is 0.20 mm.

The frame 33 is obtained by cutting a resin sheet (e.g., sheet of polycarbonate resin) having the thickness of the same extent as the light incident unit 47 of the light guide plate 34, where an opening 51 for accommodating and positioning the light guide plate 34 is provided, as shown in FIG. 5. Furthermore, a recess 52 for positioning the light source 35 mounted on the lower surface of the flexible print substrate 36 is arranged at the same pitch as the light source 35 at the end of the opening 51.

The reflection plate 32 is formed from a material having high index of refraction such as white sheet or metal foil, or is formed from a reflection mechanism such as a multi-layered film (ESR). For instance, ESR manufactured by 3M Co. having a thickness of 0.065 mm may be used. The reflection plate 32 is provided to reflect the light leaked from the lower surface of the light guide plate 34 so as to re-enter into the light guide plate 34 thereby enhancing the usage efficiency of the light.

As shown in FIG. 4, the outer peripheral part of the upper surface of the reflection plate 32 is adhered to the lower surface of the frame 33 with the double-sided adhesive tape 53. The light guide plate 34 is then accommodated in the opening 51 of the frame 33, the light source 35 is accommodated and positioned in each recess 52 so as to face the light emission window 46 of each light source 35 to the light incident end face 41 of the light guide plate 34, and the lower surface of the flexible print substrate 36 is adhered to the upper surface of the frame 33 and the upper surface of the light incident unit 47 of the light guide plate 34 by the double sided adhesive tape 54 (e.g., No. 5603 manufactured by NITTO DENKO CORPORATION having a thickness of 0.03 mm). As a result, the flexible print substrate 36 and the reflection plate 32 are fixed to the frame 33, the reflection plate 32 is brought to face the back surface of the light guide plate 34, and the light incident unit 47 of the light guide plate 34 is sandwiched by the reflection plate 32 and the flexible print substrate 36.

The thickness of the light incident unit 47 may be greater than or smaller than the height of the light source 35, but the light emission window 46 of the light source 35 needs to be arranged so as not to project above the upper end and project below the lower end of the light incident end face 41 in the assembled state. Problems do not arise even if the lower surface of the light source 35 is retracted from the back surface of the light guide plate 34, and a gap is formed with the reflection plate 32.

When the light source 35 is lighted, the light emitted from the light source 35 is introduced into the light guide plate 34 from the light incident end face 41, and guided through the light guide plate 34 while repeating total reflection between the upper surface and the lower surface of the light guide plate 34. The light that is totally reflected or diffused by the deflection pattern 40 in the middle of being guided, and entered with an incident angle smaller than the critical angle towards the light exit surface 42 is exit to the outside from the light exit surface 42.

The diffuser plate 37 and two prism sheets 38a, 38b are mounted in an overlapping manner on the upper surface of the light guide plate main body 49, and the edges are held down with the light shielding tape 39. D122Ls4 manufactured by TSUJIDEN Co., Ltd. having a thickness of 0.047 mm may be used for the diffuser plate 37. The diffuser plate 37 is overlapped on the upper surface of the light guide plate main body 49 so as not to run out to the inclined surface 50. In other words, the end of the diffuser plate 37 is arranged at a position retracted from the lower end of the inclined surface 50 (boundary with the upper surface of the light guide plate main body 49). The extent of retracting the end of the diffuser plate 37 is such that the light leaked from the lower end of the inclined surface 50 is less likely to enter the end face of the diffuser plate 37.

In the prism sheets 38a, 38b, a linear prism having a triangular cross-section with a vertex of 90° is arrayed in parallel at a constant pitch on a surface (upper surface) facing the side opposite to the light guide plate 34. TBEF2-T manufactured by 3M having a thickness of 0.062 mm may be used for the prism sheets 38a, 38b. The two prism sheets 38a, 38b are arranged so that the prism ridge direction is orthogonal to each other when viewed from a direction perpendicular to the sheet surface. The prism sheets 38a, 38b are also arranged such that angles $\phi 1$, $\phi 2$ formed by the respective prism ridge direction and a perpendicular line C perpendicular to the light incident end face 41 is 45° when viewed from the direction perpendicular to the sheet surface (see FIG. 6A).

The end of the prism sheet 38a on the lower side, of the prism sheets 38b, 38a overlapped one over the other, is extended towards the upper side of the inclined surface 50 and covers the majority of the inclined surface 50. An air layer 56 according to one or more embodiments of the present invention is sandwiched between the lower surface of the end of the prism sheet 38a and the inclined surface 50 so that the adhering area of the prism sheet 38a and the inclined surface 50 is as small as possible. The extended length of the end of the prism sheet 38a is desirably made as long as possible at an extent the upper end of the prism sheet 38a does not run out above the horizontal surface including the upper surface of the light incident unit 47. The end of the prism sheet 38b on the upper side is desirably arranged so as not to overlap the inclined portion of the prism sheet 38a.

As opposed to the configuration described above, the prism sheet 38a on the lower side may be retracted from the lower end of the inclined surface 50, and the prism sheet 38b on the upper side may be extended to the upper side of the inclined surface 50. In some cases, both the upper and lower prism sheets 38b, 38a may be extended to the upper side of the inclined surface 50 (to be described later).

The light shielding tape 39 is a black adhesive tape. For the light shielding tape 39, 7045 (0.05) black HF manufactured by TERAOKA SEISAKUSHO Co., Ltd having a thickness of 0.05 mm. A window 55 for exposing the prism sheet 38b is opened in the light shielding tape 39 in a light emitting region (effective region) of the light guide plate main body 49. The light shielding tape 39 is attached to the entire periphery of the outer peripheral part of the upper surface of the flexible print substrate 36 and the upper surface of the prism sheet 38b, and is also attached to the upper surface of the frame 33 on the side opposite to the flexible print substrate 36. The diffuse plate 37 and the prism sheets 38a, 38b are thereby held by the light shielding tape 39.

In the area light source device 31 having the above structure, the prism sheet 38a extended to the upper side of the inclined surface 50 is lifted up by the diffuse plate 37, so that the air layer 56 is formed between the inclined surface 50 and the lower surface of the prism sheet 38a. The critical angle in the light guide plate material brought into contact with the air layer 56 is smaller than the critical angle in the light guide plate material adhered to the resin layer (diffuse plate 37 or prism sheet 38a) so that light is less likely to leak out by forming the air layer 56 under the prism sheet 38a. In particular, the light amount is the greatest in the light guide plate 34, and there are great amount of light that is totally reflected a number of times at the back surface of the light guide plate 34 and the inclined surface 50 so that the proportion of the light that leaks out is large at the lower end of the inclined surface 50, but the leakage of light can be suppressed small since the air layer 56 is reliably formed in this region. Therefore, according to the area light source device 31, the light loss due to the leakage light from the inclined surface 50 is reduced and the luminance in the light emitting region is enhanced. As the leakage of light in the inclined surface 50 reduces, the host spot and the luminance unevenness that occur when the light leaked from the inclined surface 50 becomes a stray light and reaches the light emitting region are also reduced.

However, even if the air layer 56 exists between the inclined surface 50 and the prism sheet 38a, the light entering the light incident unit 47 in the direction in which the angle with respect to the normal light of the inclined surface 50 becomes smaller than the critical angle with respect to the air layer 56 (e.g., if the light guide plate 34 is made of polycarbonate, the critical angle is 39°) leaks from the inclined surface 50 when entering the inclined surface 50.

Figure 6A:
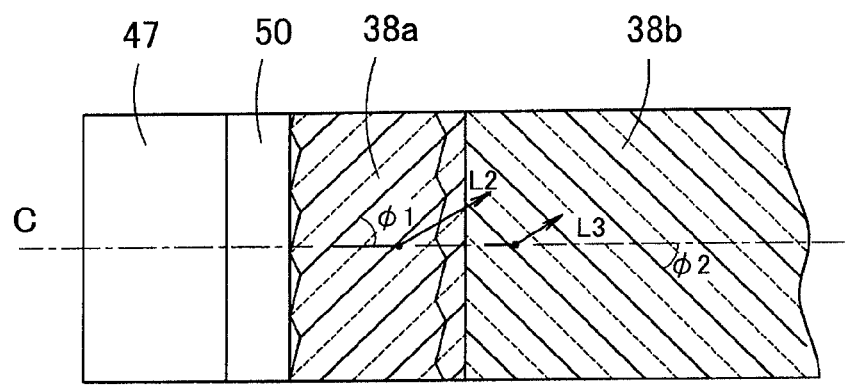
FIGS. 6A and 6B are schematic views describing the behavior of light in the area light source device of the first embodiment, where
Figure 6B:
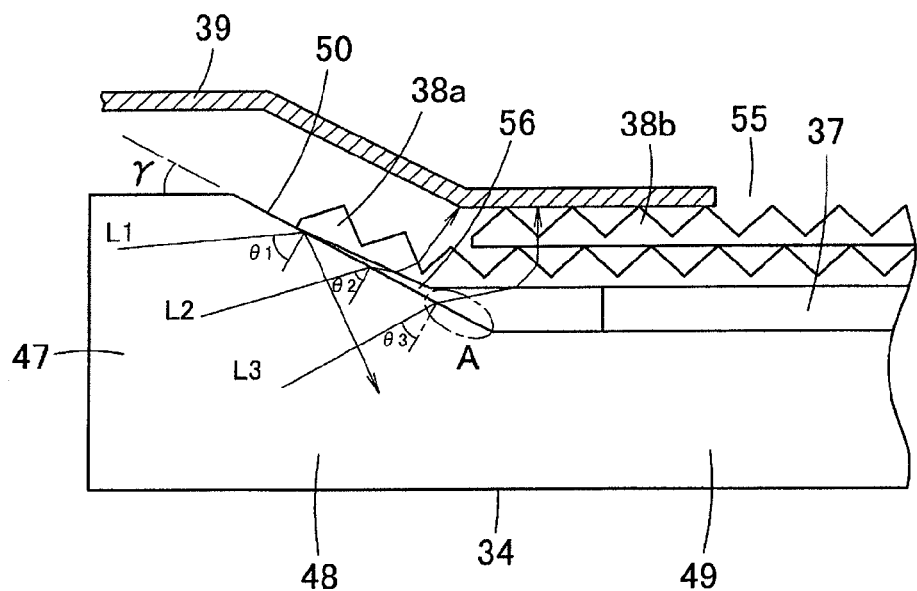

As shown in FIG. 6B, the light L1 entering at an incident angle θ greater than the critical angel with respect to the inclined surface 50 is totally reflected at the inclined surface, but the light L1 totally reflected at the inclined surface 50 again enters the inclined surface 50 by being totally reflected at the lower surface of the light guide plate 34. Assuming the inclination angle of the inclined surface 50 is γ, the incident angle when again entering the inclined surface 50 becomes smaller by 2γ, and hence the light totally reflected a number of times between the inclined surface 50 and the back surface enters the inclined surface 50 at incident angles θ2, θ3 smaller than the critical angle as with L2 and L3 in FIG. 6B and leaks out from the inclined surface 50.

As shown in FIG. 6B, the light that leaked out from the inclined surface 50 passes through the prism sheet 38a from the lower surface of the prism sheet 38a to have the optical path bent to a direction perpendicular to the prism sheet 38a and guided to the direction perpendicular to the prism sheet 38a. The light leaked from the inclined surface 50 is thus absorbed by the light shielding tape 39 and is less likely to reach the window 55 of the light shielding tape 39. Describing in accordance with FIG. 6B, the light L2 is subjected to the influence of the tilt $\phi 1$, $\phi 2$ (tilt with respect to the perpendicular line C perpendicular to the light incident end face 41) in the prism ridge direction of the prism sheets 38a, 38b, and the light L2 that passed through the prism sheet 38a is deviated obliquely from the plane including the perpendicular line C and being perpendicular to the sheet surface and directed upward thereby hitting the lower surface of the light shielding tape 39 and being absorbed thereby.

The light totally reflected a number of times at the inclined surface 50 and the back surface enters the lower end A of the inclined surface 50, and thus the region A has the most amount of light in the light guide plate 34 and the light also easily leaks out. As shown in FIGS. 6A and 6B, the light L3 that leaked from the region A leaks out from the inclined surface 50 at the location close to the window 55 than the light L2 but is bent in the direction close to perpendicular than the light L2 by passing through two upper and lower prism sheets 38a, 38b, and hence the light L3 also does not reach the window 55 but hits the lower surface of the light shielding tape 39 to be absorbed thereby.

If the lower surface of the prism sheet 38a is adhered to the inclined surface 50 and the air layer 56 does not exist, the amount of light that leaks from the inclined surface 50 increases, but in such case as well, the light that leaked from the inclined surface 50 hits the lower surface of the light shielding tape 39 to be absorbed thereby and is less likely to leak out from the window 55 due to the operation of the prism sheets 38a, 38b as described above.

As a result, in the area light source device 31, the hot spot and the luminance unevenness are less likely to occur in the light emitting region, and the light emission quality is enhanced.

Furthermore, if microscopic scratches are formed in the inclined surface 50, the light easily leaks out therefrom, but scratches that become the cause of light leakage are less likely to be formed since the prism sheet 38a is not brought into contact with the majority of the region of the inclined surface 50, in particular, the lower end A where the amount of light is large, and hence the lowering of the luminance of the light emitting region can be reduced.

Figure 7:
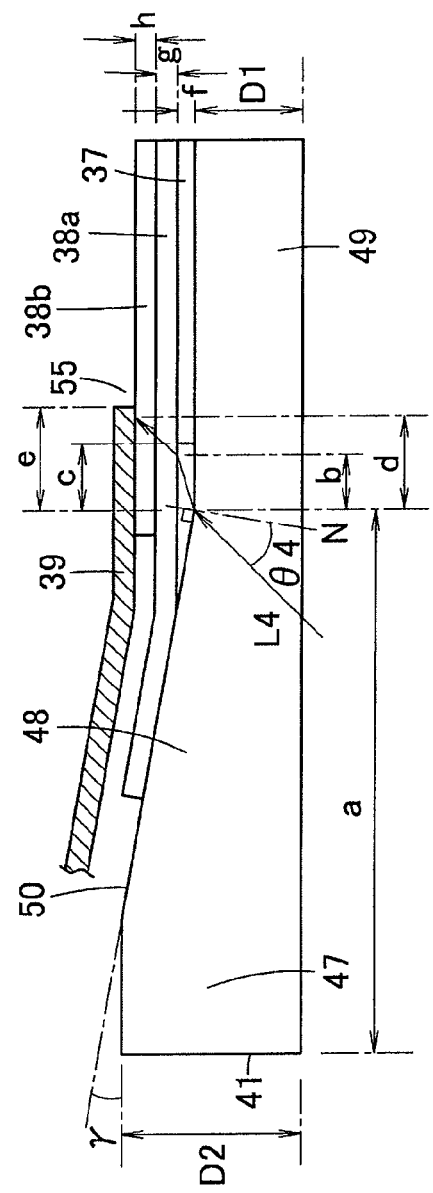

The arrangement of the diffuse plate 37 and the light shielding tape 39 will now be considered by briefly reviewing the behavior of the light leaked at the lower end of the inclined surface 50. FIG. 7 shows the behavior of the light L4 that entered the lower end of the inclined surface 50 at an angle (incident angle) of θ4 with respect to the normal line N of the inclined surface 50. The actual light in the light guide plate has various light ray directions and intensity distributions, and it is thus difficult to be uniquely handled, but the dimensional relationship of each element can be schematically obtained by simplifying a tracking of the representative light ray.

Consider the light L4 that leaked from the lower end of the inclined surface 50 that is the portion where the light easily leaks out the most. Assume a value slightly smaller than the critical angle of the light guide plate material with respect to the air layer for the incident angle θ4 to the inclined surface 50 of the light L4. Specifically, if the light guide plate material is the polycarbonate resin, the critical angle at the boundary with the air layer becomes about 39°, so that the incident angle θ4 becomes 35° that is slightly smaller than the critical angle.

When the light that leaked from the inclined surface 50 enters the end face of the diffuser plate 37, the light is guided through the diffuser plate 37 and an elongate luminance unevenness occurs similar to the related art, and hence the condition in which the light that leaked from the inclined surface 50 does not enter the end face of the diffuser plate 37 will be considered. When obtaining the condition in which the light that leaked from the inclined surface 50 does not enter the end face of the diffuser plate 37, the light that leaked from the lower end of the inclined surface 50 closest to the diffuser plate 37 merely needs to be considered. Assuming the inclination angle of the inclined surface 50 is γ and the index of refraction of the light guide plate material is n1, the light L4 that leaked from the lower end of the inclined surface 50 advances through the air layer 56 in the direction that forms an angle of $$90° - \gamma - \arcsin(n1 \cdot \sin \theta 4) \quad \text{(equation 1)}$$

with respect to the upper surface of the light guide plate main body 49. Assuming the thickness of the diffuser plate 37 is f, a horizontal distance b in which a distance the light L4 advances through the air layer 56 after exiting from the lower end of the inclined surface 50 and reaches the lower surface of the prism sheet 38a is projected in the horizontal direction is obtained by, $$b = f \tan(\kappa) \quad \text{(equation)}$$

where $\kappa = \gamma + \arcsin(n1 \cdot \sin \theta 4)$.

Therefore, if a horizontal distance c from the lower end of the inclined surface 50 to the end face of the diffuser plate 37 is greater than the horizontal distance b in equation 2, the leakage light L4 avoids the diffuser plate 37 and enters the prism sheet 38a. In other words, $$C > f \tan(\kappa) \quad \text{(equation 3)}$$

is to be met.

If the incident angle θ4 is 35°, the inclination angle of the inclined surface 50 is γ=10°, the thickness of the diffuser plate 37 is f=0.047 mm, and the index of refraction of the light guide plate material (polycarbonate resin) is n1=1.59, as described above, κ=75.8° is obtained, and hence equation 3 becomes $$C > 0.186 \text{ mm.}$$

Therefore, c=0.20 mm.

The condition for absorbing the leakage light L4 by being hit against the lower surface of the light shielding tape 39 will now be considered. Here, the prism sheets 38a, 38b are simplified and replaced with a flat sheet. The incident angle of the light L4 that enters the lower surface of the prism sheet 38a is, γ+arcsin(n1·sin θ4), and hence if the index of refraction of the prism sheets 38a, 38b is n2, the angle (refraction angle) formed by the light L4 that passes through the prism sheets 38a, 38b and the direction perpendicular to the prism sheets 38a, 38b is obtained by, $$\arcsin[(1/n2)\sin(\kappa)] \quad \text{(Equation 4)}.$$

Therefore, if the thicknesses of the prism sheets 38a, 38b are g, h, respectively, the horizontal distance d from the lower end of the inclined surface 50 up to the point where the light L4 hits the lower surface of the light shielding tape 39 is obtained by, $$d = b + (g+h) \times \tan\{\arcsin[(1/n2)\sin(\kappa)]\} \quad \text{(equation 5)}$$

where $\kappa = \gamma * \arcsin(n1 \cdot \sin \theta 4)$.

Actually, the light passing through the prism sheet 38a is deflected to the perpendicularly upper side by the prism and also deflected to the perpendicularly upper side by the prism of the prism sheet 38b, and hence the horizontal distance from the lower end of the inclined surface 50 up to the point where the light L4 hits the lower surface of the light shielding tape 39 becomes shorter than d expressed with equation 5. Therefore, a horizontal distance e measured from the lower end of the inclined surface 50 up to the edge of the window 55 of the light shielding tape 39 merely needs to be greater than the value of d in order to absorb the light L4 leaked from the lower end of the inclined surface 50 at the lower surface of the light shielding tape 39. In other words, $$e > b + (g+h) \times \tan\{\arcsin[(1/n2)\sin(\kappa)]\} \quad \text{(equation 6)}.$$

The value of the horizontal distance b is 0.186 mm and the value of κ of 75.8°, and thus if both prism sheets 38a, 38b are made of acrylic resin, the index of refraction is n2=1.5 and the thickness is g=h=0.062 mm, equation 6 becomes $$e > 0.27 \text{ mm.}$$

Therefore, e=0.30 mm.

The area of the prism sheets 38a, 38b is as wide as possible, but the prism sheet 38b on the upper side is not to interfere with the inclined portion of the prism sheet 38a on the lower side.

With respect to the other dimension, the thickness of the light incident unit 47 is D2=0.50 mm (or 0.43 mm), the thickness of the light guide plate main body 49 is D1=0.30 mm (or 0.20 mm), and the horizontal distance from the light incident end face 41 to the lower end of the inclined surface 50 is a=1.50 mm.

The light that enters the end face of the diffuser plate 37 can be significantly reduced by defining the position of the end face of the diffuser plate 37, and thus the luminance unevenness can be reduced. Furthermore, the majority of the leakage light that passed through the prism sheets 38a, 38b can be hit against the light shielding tape 39 and absorbed by defining the length up to the edge of the window 55 of the light shielding tape 39. In particular, according to the first embodiment, the length (length up to the edge of the inclined surface 50) necessary for absorbing the light that leaked from the inclined surface 50 at the light shielding tape 39 can be made shorter than in the related art, and thus the area in which the light emitting region of the light guide plate main body 49 is covered with the light shielding tape 39 becomes smaller and the usable area of the light emitting region becomes wider.

Figure 8A:
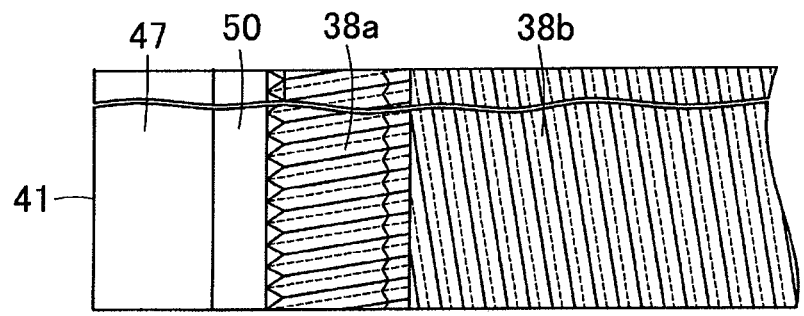
FIG. 8A is a plan view showing a state in which the upper and lower prism sheets are arranged such that a prism ridge direction of the prism sheet on the lower side is substantially perpendicular to the light incident end face.
Figure 8B:
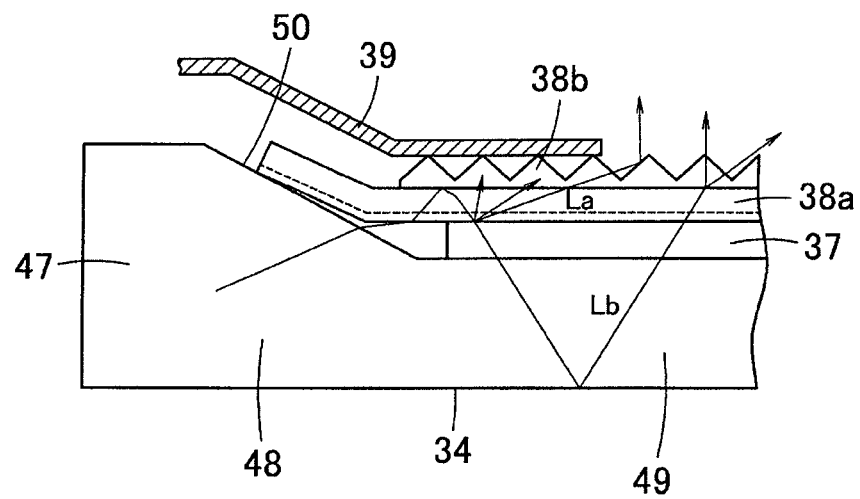
FIG. 8B is a cross-sectional view showing the behavior of the light in such case.

The angle in the prism ridge direction of the prism sheets 38a, 38b will now be described. As shown in FIG. 8A, if arranged such that the prism ridge direction of the prism sheet 38a on the lower side is close to parallel with the direction perpendicular to the light incident end face 41 and the prism ridge direction of the prism sheet 38b on the upper side is close to parallel with the light incident end face 41 when viewed from the direction perpendicular to the sheet surface of the prism sheets 38a, 38b, the light is regressively reflected at the prism surface as the incident angle of the light with respect to the prism surface of the prism sheet 38a becomes large when the light leaks from the inclined surface 50, the light (this light is indicated as light La in FIG. 8B) returned towards the light guide plate 34 by regressive reflection is diffuse reflected by the diffuser plate 37 and one part thereof reaches the inner side of the window 55 of the light shielding tape 39 thus newly causing luminance unevenness. As shown with light Lb in FIG. 8B, the light that passed through the diffuser plate 37 is reflected by the reflection plate 32 and returned and passed through the diffuser plate 37 and the prism sheets 38a, 38b to brightly light the light emitting region, thus causing luminance unevenness. The prism ridge direction of the prism sheet 38a needs to be greatly tilted to a certain extent from the direction perpendicular to the light incident end face 41 to avoid optical adverse affect.

Figure 9:
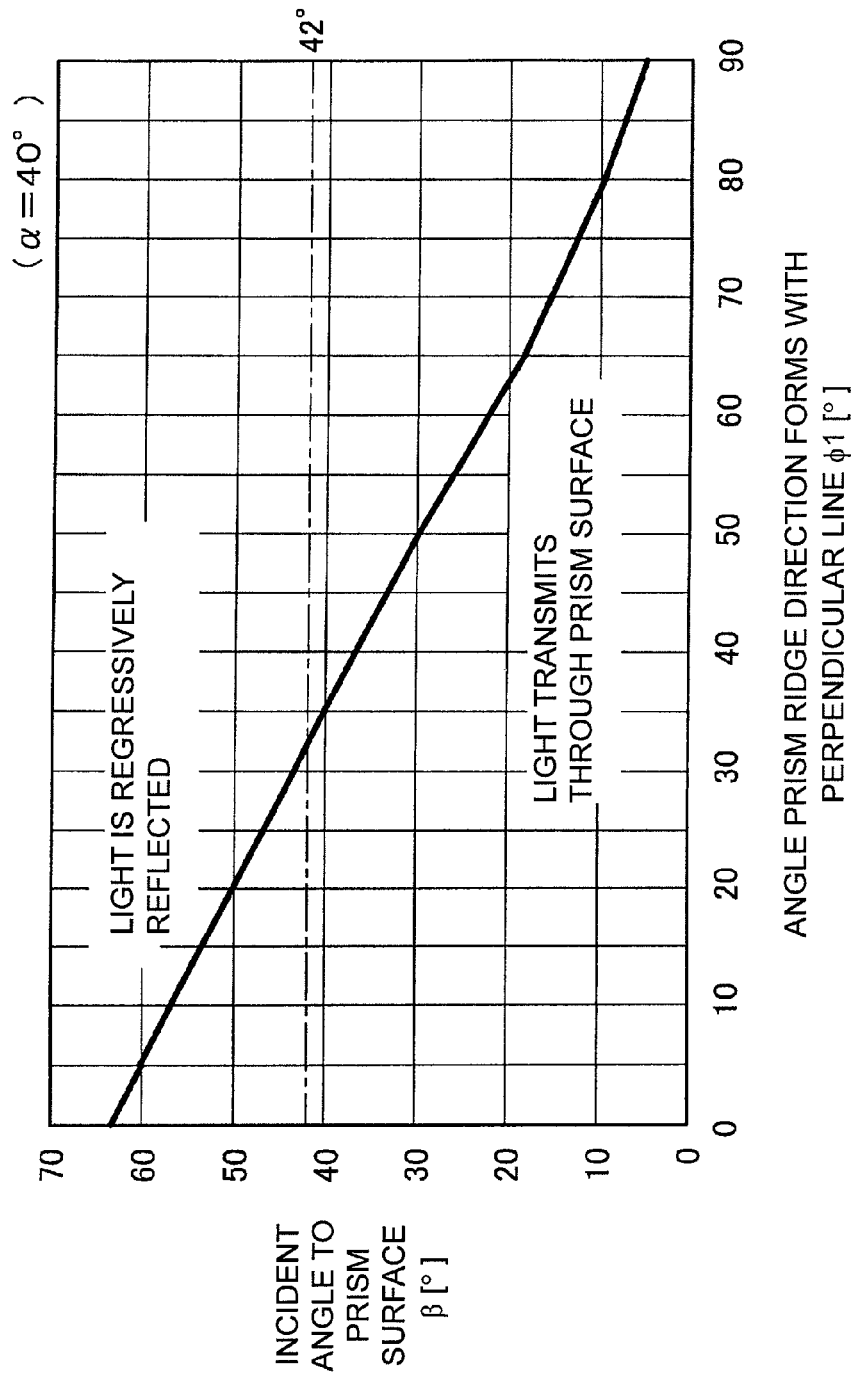
FIG. 9 is a view showing a relationship of an angle $\phi 1$ the prism ridge direction of the prism sheet on the lower side forms with a perpendicular line C perpendicular to the light incident end face, and an incident angle $\beta$ of the light to the prism surface in such case.
Figure 10A:
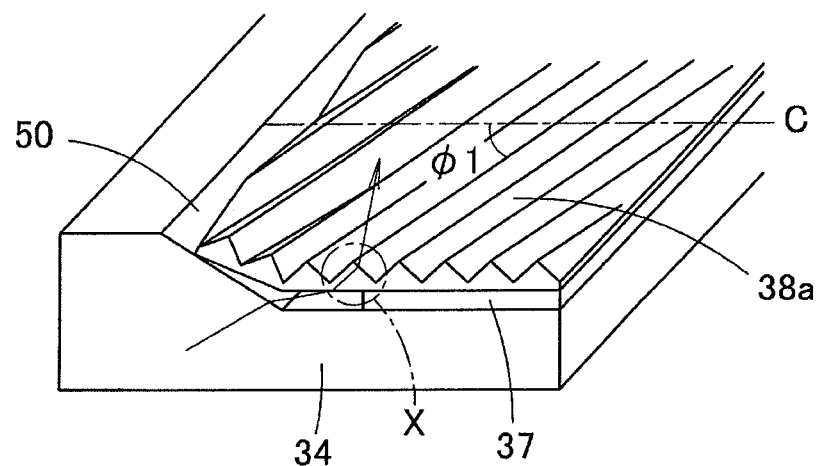
FIGS. 10A and 10B are explanatory views of FIG. 9.
Figure 10B:
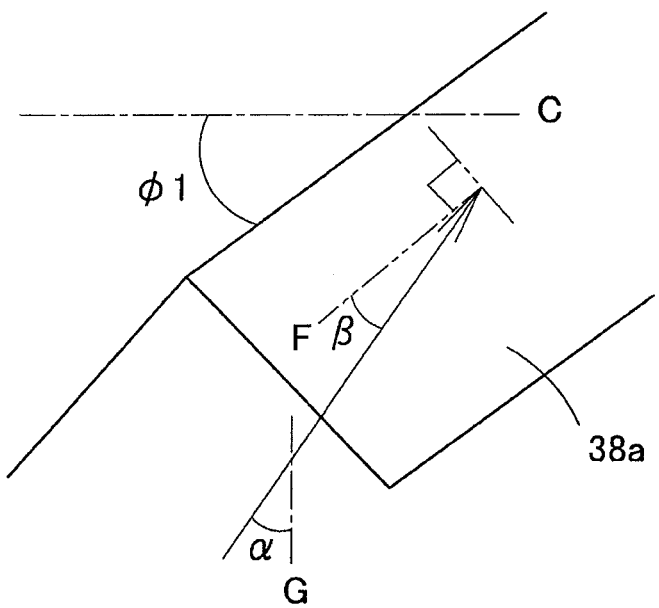

FIG. 10A shows the prism sheet 38a arranged on the upper surface of the light guide plate 34 so that the prism ridge direction forms an angle φ1 with respect to the perpendicular line C perpendicular to the light incident end face 41. The angle φ1 the prism ridge direction forms with respect to the perpendicular line C perpendicular to the light incident end face 41 does not depend on the rotation direction of the prism ridge, and is defined such that the angle measured from the perpendicular line C is greater than or equal to 0° and smaller than or equal to 90°. In other words, the value region of the φ1 is 0°≤φ1≤90°. FIG. 10B shows the portion (X portion) where the light enters the prism surface of the prism sheet 38a in FIG. 10A in an enlarged manner. When the representative light that leaked from the inclined surface 50 enters the prism sheet 38a, the light forms an angle of α=40° with respect to a perpendicular line G perpendicular to the sheet surface (or lower surface of the light guide plate 34) in the prism sheet 38a. Therefore, consider a case where the light that forms an angle of α=40° with respect to the perpendicular line G enters the prism surface having a vertex angle of 90°. FIG. 9 is a view showing the relationship between the angle φ1 the prism ridge direction of the prism sheet 38a forms with the perpendicular line C perpendicular to the light incident end face 41, and the incident angle β of the light to the prism surface in such case when the light in the direction of α=40° enters the prism surface of the vertex angle 90° in the prism sheet 38a.

If the prism sheet 38a is made of acrylic resin, the index of refraction thereof is n2=1.5, and thus the critical angle at the boundary of the prism surface and the air is $$\arcsin(1/n2) \cong 42°.$$

Therefore, if the incident angle β<42°, the light is transmitted through the prism surface and absorbed by the light shielding tape 39 as shown in FIG. 10A. If the incident angle β>42°, on the other hand, the light is regressively reflected at the prism surface, and exit from the window 55 of the light shielding tape 39 as with the lights La, Lb in FIG. 8B thus causing hot spot and luminance unevenness. According to FIG. 9, the incident light β<42° is realized since the tilt φ1 in the prism ridge direction is greater than or equal to 30°, and hence the prism sheet 38a needs to be arranged in a tilted manner so that the tilt φ1 in the prism ridge direction is greater than or equal to 30° and smaller than or equal to 90° to prevent hot spot and luminance unevenness.

In view of the above, the respective prism sheets 38a, 38b are arranged such that the prism ridge direction thereof forms an angle of about 45° with respect to the direction C perpendicular to the light incident end face 41 in the area light source device 31 of the first embodiment.

Figure 11:
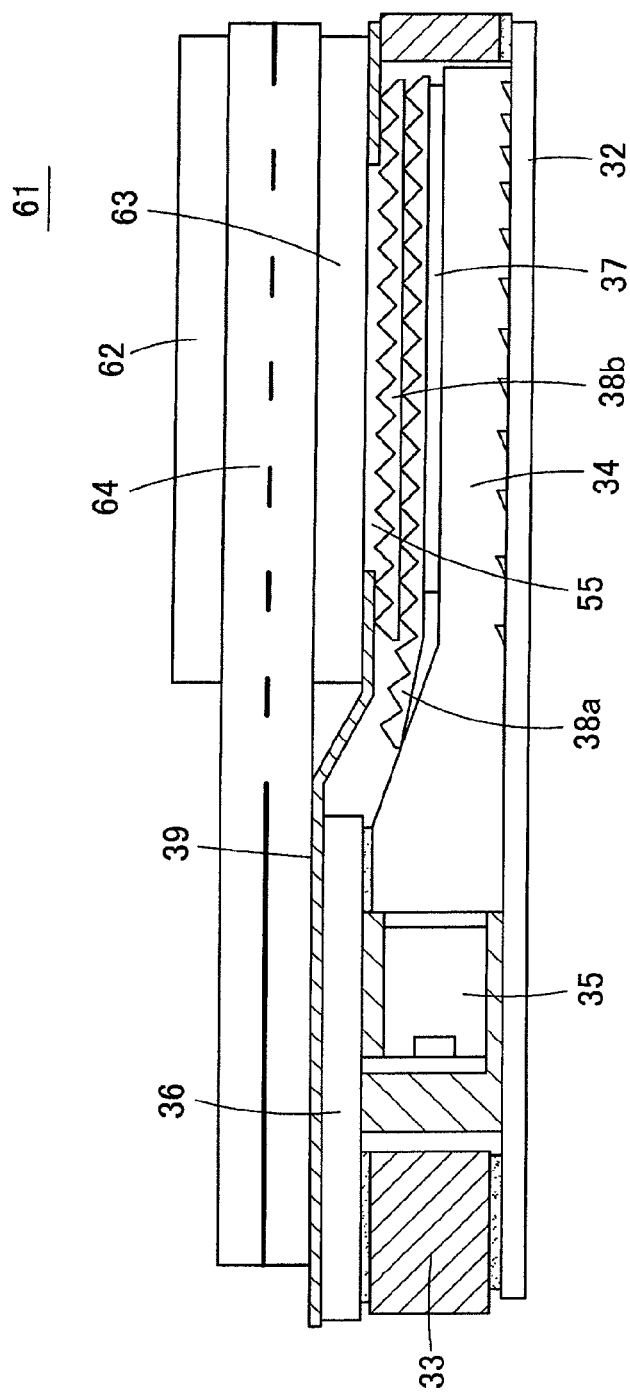
FIG. 11 is a schematic cross-sectional view of a liquid crystal display device using the area light source device of the first embodiment.

FIG. 11 shows a liquid crystal display device 61 configured by overlapping a liquid crystal panel 64 on the area light source device 31. The liquid crystal panel 64 has liquid crystal material sandwiched and sealed between a pair of glass substrates, and has a size (area) of substantially the same extent as the area light source device 31. Polarization plates 62, 63 are respectively attached to the region facing the light guide plate main body 49 of both upper and lower surfaces of the liquid crystal panel 64. The thickness of the polarization plate 63 on the lower surface side is equal to the step dimension between the upper surface of the flexible print substrate 36 and the prism upper end of the prism sheet 38b. Therefore, when the liquid crystal panel 64 is overlapped and adhered to the light shielding tape 39, the polarization plate 63 on the lower surface side fits into the lowered portion of the area light source device 31 so that the upper surface of the light shielding tape 39 adhered to the upper surface of the flexible print substrate 36 and the upper surface of the polarization plate 63 become substantially the same height. Thus, the liquid crystal panel 64 is horizontally and stably held by the flexible print substrate 36, the light shielding tape 39, and the polarization plate 63.

Second Embodiment

Figure 12:
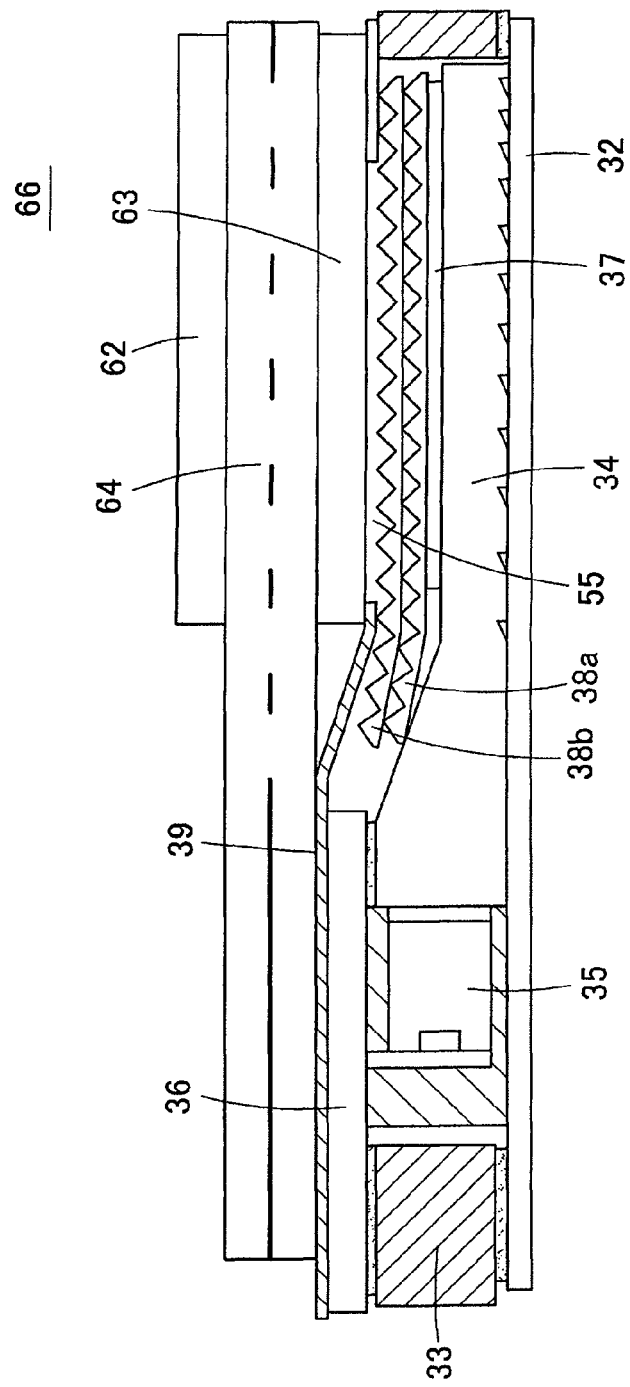
FIG. 12 is a schematic cross-sectional view showing a liquid crystal display device according to a second embodiment of the present invention.

FIG. 12 is a schematic cross-sectional view of a liquid crystal display device 66 according to a second embodiment of the present invention. In the liquid crystal display device 66, the ends of the polarization plates 62, 63 are retracted than the lower end of the inclined surface 50 to form a space at the upper surface of the prism sheet 38a on the upper side of the inclined surface 50. Therefore, the prism sheet 38b on the upper side can also be extended towards the upper side of the inclined surface 50 using this space.

Therefore, if the upper and lower prism sheets 38a, 38b are extended towards the upper surface of the inclined surface 50, the light that leaked from the inclined surface 50 near the light source 35 is deflected towards the upper side by the two upper and lower prism sheets 38a, 38b, respectively, and hence the leakage light can be easily absorbed at the light shielding tape 39. Therefore, the light is less likely to leak from the window 55, and the light emission quality can be further enhanced with the hot spot and the luminance unevenness reduced.

Third Embodiment

Figure 13A:
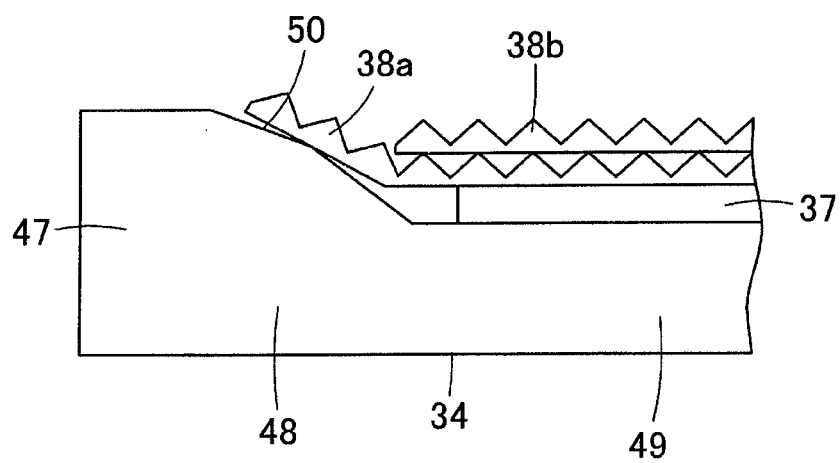
FIG. 13A is schematic view for describing an area light source device according to a third embodiment of the present invention.

FIG. 13A is a schematic view showing one part of an area light source device according to a third embodiment of the present invention. In this area light source device, the inclined surface 50 is configured by planes of a plurality of levels (two levels in FIG. 13A) having different inclination angles, where the middle level of the inclined surface 50 is projected out. According to this structure, the corner of the end face of the prism sheet 38a is floated from the inclined surface 50 and does not hit the inclined surface 50, so that the inclined surface 50 can be prevented from being scratched when the corner of the prism sheet 38a hits the inclined surface 50 by vibration or impact as with the case where the inclined surface 50 is flat. As a result, the leakage of light from the scratched area of the inclined surface 50 can be reduced and the light emission quality of the area light source device can be enhanced.

Figure 13B:
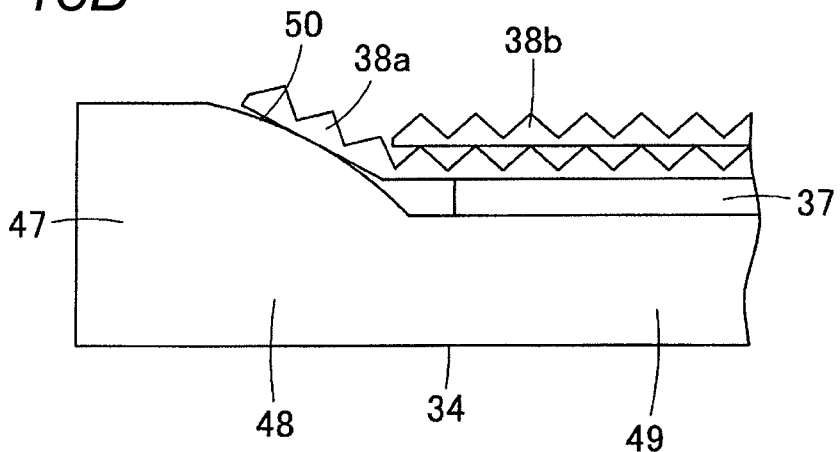
FIG. 13B is a schematic view for describing a variant of the third embodiment.

FIG. 13B shows a variant of the third embodiment. In this variant, the cross-section of the inclined surface 50 in a plane perpendicular to the lower surface of the light guide plate 34 and the light incident end face 41 is curved to an arcuate shape, or the like. According to this variant, the inclined surface 50 is more unlikely to be scratched since the lower surface of the prism sheet 38a smoothly comes in contact with the inclined surface 50.

Fourth Embodiment

Figure 14:
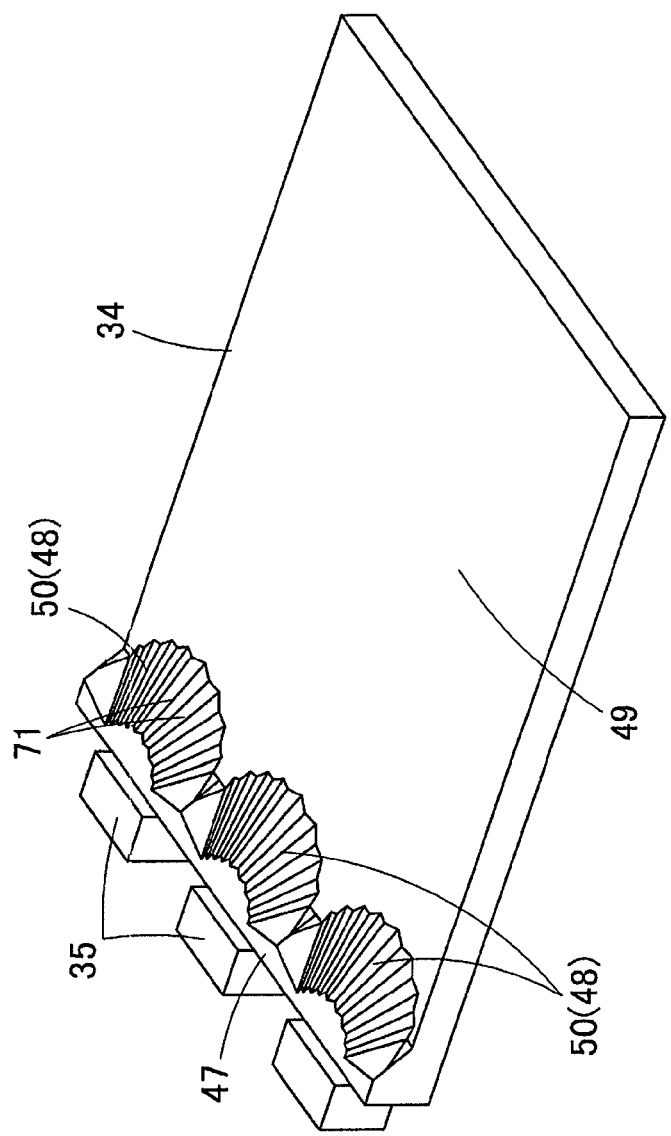
FIG. 14 is a perspective view showing a light guide plate used in an area light source device according to a fourth embodiment of the present invention.
Figure 15:
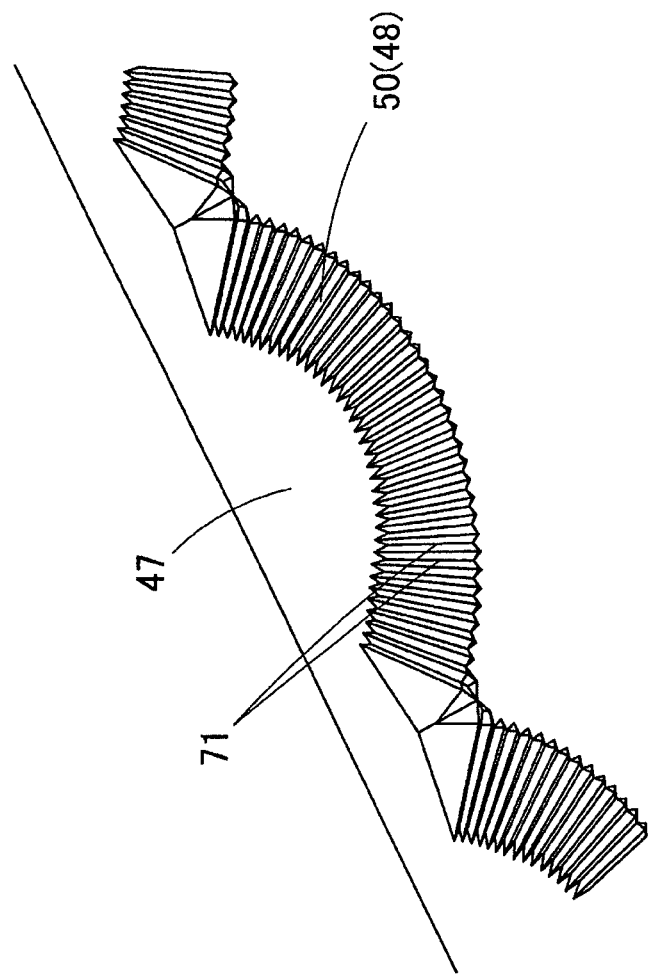
FIG. 15 is a detailed view showing a conical inclined surface of the light introducing unit in the light guide plate of FIG. 14.

FIG. 14 is a schematic view showing the light guide plate 34 and the light source 35 used in an area light source device of a fourth embodiment of the present invention. FIG. 15 is a perspective view showing in detail the light introducing unit 48 of the light guide plate 34 shown in FIG. 14.

In the fourth embodiment, the light introducing unit 48 in which the front surface is the conical inclined surface 50 is arranged on the front side of each light source 35. Furthermore, a V-shaped groove 71 along the inclined direction of the inclined surface 50 is radially formed in each inclined surface 50. Although not illustrated, at least one of the prism sheet 38a and the prism sheet 38b is extended towards the upper surface of the inclined surface 50 and overlapped on the upper side of the inclined surface 50 in this embodiment as well.

In this embodiment, the V-shaped groove 71 (radial prism) is formed in the inclined surface 50, and hence the leakage of light from the inclined surface 50 can be reduced by regressive reflecting the light that entered the inclined surface 50 with the V groove 71. Since the V-shaped groove 71 is formed in the inclined surface 50, the prism sheet extended to above the inclined surface 50 and the inclined surface 50 come into linear contact with each other so that the contact area is reduced. As a result, the leakage light from the inclined surface 50 is reduced, and the light emitting luminance of the light emitting region is enhanced. Furthermore, the host spot and the luminance unevenness are also reduced and the effect of improving the light emission quality is enhanced since the leakage light from the inclined surface 50 is reduced.

Fifth Embodiment

Figure 16:
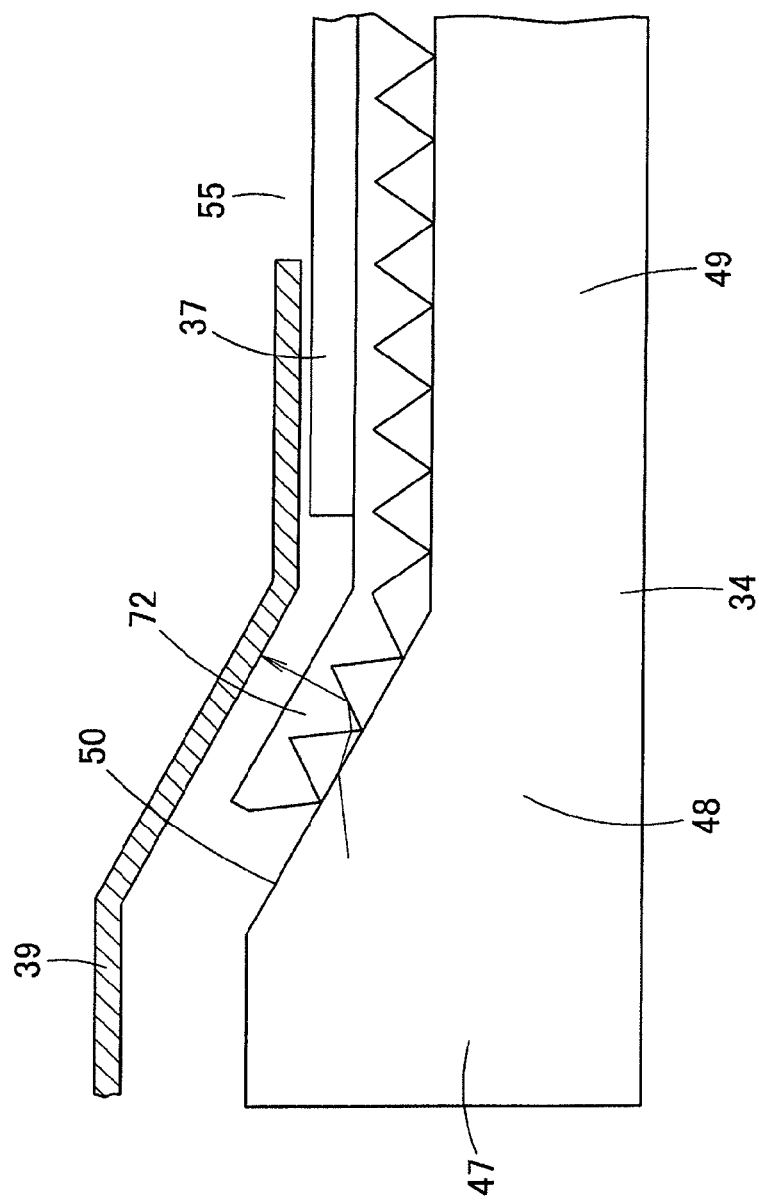
FIG. 16 is a schematic view describing an area light source device according to a fifth embodiment of the present invention.

FIG. 16 is a schematic view of an area light source device according to a fifth embodiment of the present invention. In such area light source device, one prism sheet 72 is directly overlapped on the upper surface of the light guide plate main body 49, and the diffuser plate 37 is overlapped thereon. A prism having a triangular cross-section is formed at the lower surface of the prism sheet 72, and the end of the prism sheet 72 is extended from the upper surface of the light guide plate main body 49 towards the upper surface of the inclined surface 50. Here, diamond art M 168 YK manufactured by Mitsubishi Rayon Co., Ltd. having a thickness of 190 µm, prism pitch of 50 µm, and a prism vertex angle 68° can be used for the prism sheet 72. The end of the diffuser plate 37 is retracted from the lower end of the inclined surface 50.

In the case of the prism sheet in which the prism is formed on the upper surface, the light is deflected in the perpendicular direction by the refraction of light passing through the prism. On the contrary, in the case of the prism sheet in which the prism is formed on the lower surface, the light is deflected in the perpendicular direction by totally reflecting the light that entered the prism with the prism surface. Therefore, the prism sheet 72 in which the prism is formed on the lower surface has a high efficiency of deflecting the light in the perpendicular direction and collecting the light. In one example, the light of about 1.5 times can be deflected in the perpendicular direction compared to the prism sheet in which the prism is formed on the lower surface.

Therefore, when using the prism sheet 72 in which the prism is arranged on the lower surface, the light that leaked from the inclined surface 50 is efficiently deflected to the direction perpendicular to the prism sheet 72 by transmitting the prism sheet 72, and then hit and absorbed at the lower surface of the light shielding tape 39. Therefore, the light leaked from the inclined surface 50 is less likely to leak out from the window 55 of the light shielding tape 39, so that the hot spot and the luminance unevenness can be reduced and the light emission quality can be improved.

The light emitted from the light emitting region is efficiently collected in the front surface direction by the prism sheet 72, so that the luminance of the area light source device can be enhanced.

The edge of the window 55 of the light shielding tape 39 can be brought close to the inclined surface 50 since the prism sheet 72 has high light collecting property.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. An area light source device comprising:
  a light guide plate including:
  a light incident end face,
  a light guide plate main body thinner than a thickness of the light incident end face, and
  a light introducing unit formed in continuation with the light guide plate main body and so that thickness gradually becomes thinner from the light incident end face side towards the light guide plate main body side;
  a light source arranged at a position facing the light incident end face;
  a diffuser plate and one or more prism sheets arranged on a surface on a light emission side of the light guide plate main body; and
  a light shielding sheet arranged on an upper side of the diffuser plate and the prism sheet in a region excluding a light emitting region of the light guide plate main body;

wherein at least one of the one or more prism sheets is extended towards a front surface of the light introducing unit, and wherein at least one extended prism sheet of the one or more prism sheets is arranged so that a prism ridge direction forms an angle of greater than or equal to 30° and smaller than or equal to 90° with respect to a direction perpendicular to the light incident end face.

2. The area light source device according to claim 1, wherein the diffuser plate is arranged on a surface on the light emission side of the light guide plate main body, two prism sheets in which a prism is formed on a surface on a side opposite to a surface facing the diffuser plate is overlapped on the diffuser plate; and at least one of the two prism sheets is extended towards the front surface of the light introducing unit.

3. The area light source device according to claim 2, wherein two prism sheets are stacked at the front surface of the light introducing unit.

4. The area light source device according to claim 2, wherein an air layer is arranged between the prism sheet extended towards the front surface of the light introducing unit and the front surface of the light introducing unit.

5. The area light source device according to claim 1, wherein one prism sheet in which a prism is formed on a surface facing the light guide plate main body is arranged on a surface on the light emission side of the light guide plate main body, and the diffuser plate is overlapped on the prism sheet.

6. The area light source device according to claim 1, wherein the diffuser plate is arranged at a position spaced apart than a boundary of the light introducing unit and the light guide plate main body.

7. The area light source device according to claim 1, wherein the surface on the light emission side of the light introducing unit is an inclined surface.

8. The area light source device according to claim 1, wherein the surface on the light emission side of the light introducing unit is formed as if expanded with a plurality of planes.

9. The area light source device according to claim 1, wherein the surface on the light emission side of the light introducing unit is formed as if expanded with a curved surface.

* * * * *